Oct. 2, 1951 C. R. DOTY ET AL 2,569,805

TYPEWRITER AND CARD PUNCH COMBINATION

Filed Feb. 14, 1947 8 Sheets-Sheet 1

INVENTORS
CHARLES R. DOTY
HERMAN J. KLOTZ
THEODORE D. KORANYE

BY J. W. Lowenitzer
ATTORNEY

Oct. 2, 1951 C. R. DOTY ET AL 2,569,805

TYPEWRITER AND CARD PUNCH COMBINATION

Filed Feb. 14, 1947 8 Sheets-Sheet 2

INVENTORS
CHARLES R. DOTY
HERMAN J. KLOTZ
THEODORE D. KORANYE

BY J. W. Lowwitzer
ATTORNEY

Oct. 2, 1951 C. R. DOTY ET AL 2,569,805

TYPEWRITER AND CARD PUNCH COMBINATION

Filed Feb. 14, 1947 8 Sheets-Sheet 3

INVENTORS
CHARLES R. DOTY
HERMAN J. KLOTZ
THEODORE D. KORANYE
BY J. W. Lowmitzer
ATTORNEY

TYPEWRITER AND CARD PUNCH COMBINATION

Filed Feb. 14, 1947

8 Sheets-Sheet 4

INVENTORS
CHARLES R. DOTY
HERMAN J. KLOTZ
BY THEODORE D KORANYE
J. W. Lowenitzer
ATTORNEY Oct. 2, 1951 C. R. DOTY ET AL 2,569,805

TYPEWRITER AND CARD PUNCH COMBINATION

Filed Feb. 14, 1947 8 Sheets-Sheet 5

INVENTORS
CHARLES R. DOTY
HERMAN J. KLOTZ
BY THEODORE D. KORANYE
I. W. Lowenitzer
ATTORNEY Oct. 2, 1951 C. R. DOTY ET AL 2,569,805

TYPEWRITER AND CARD PUNCH COMBINATION

Filed Feb. 14, 1947 8 Sheets-Sheet 6

INVENTORS
CHARLES R. DOTY
HERMAN J. KLOTZ
THEODORE D. KORANYE
BY J. W. Lowenitzer
ATTORNEY INVENTORS
CHARLES R. DOTY
HERMAN J. KLOTZ
BY THEODORE D. KORANYE
J. W. Lonnitzer
ATTORNEY INVENTORS
CHARLES R. DOTY
HERMAN J. KLOTZ
BY THEODORE D. KORANYE
J. W. Lowenitzer
ATTORNEY Patented Oct. 2, 1951

2,569,805

UNITED STATES PATENT OFFICE 2,569,805

TYPEWRITER AND CARD PUNCH COMBINATION

Charles R. Doty, Yonkers, Herman J. Klotz, Endicott, and Theodore D. Koranye, Vestal, N. Y., assignors to International Business Machines Corporation, New York, N. Y., a corporation of New York Application February 14, 1947, Serial No. 728,600

10 Claims. (Cl. 164—115)

This invention relates to improvements in machines of the type shown in the patents to C. R. Doty, No. 2,318,299 and No. 2,390,486, both of which disclose interconnected typewriter and card punching machines which are also controlled by an auxiliary keyboard. The present improvements involve structural changes in the punching machine and typewriter and such changes and a novel coordination between such machines and the auxiliary keyboard enable functions to be performed which are new over the aforementioned patents.

One of the features of the invention relates to improvements which enables duplication of data derived from a master card upon a card in the punching machine and to call such duplicating operations selectively at desired positions of the carriage and to suppress such operations at other positions of the card carriage whereby predetermined columns of the master card may be duplicated.

Another object relates to means which enables by a pre-punched master card in the punch machine the selection and operation of the type bars of the typewriter to effect automatic typing of the data represented on the master card on the sheet in the typewriter machine.

Another object of the invention relates to selective connections between the punching machine and the typewriter which enables such automatic typing duplicating operations to be called in at desired column positions of the punch carriage and suppressed at other column positions.

Another object of the invention is to delay master card control of duplicating operations, both typing and punching until the typewriter carriage has been spaced to a predetermined position.

Another object of the invention relates to functions which are initiated by the column readout of the card punching machine and to effect such operations by two different types, one of which is called herein "slide-in operations" and the other "slide-out operations." These comprise control functions which are initiated as the card carriage moves into a column. The other class of operations are those which are initiated on moving out of a column position of the carriage. To exemplify the latter operations, these in general comprise punctuation typing operations since it is generally desirable that these be effected after numeral recording performed by the digit keys of the auxiliary keyboard. An operation of the first class is exemplified by the zero suppressing operations, wherein it will be observed that immediately upon moving in a certain column position of the punch carriage, zero typing should be suppressed for this particular column as well as successive columns. There are other functions and operations which are in this class or type and will be specifically mentioned as the specification progresses.

Another object of the invention relates to a special control which enables automatic typewriter key strokes to perform special characterizations at both sides of the digit typed by the desired key of the auxiliary keyboard. It may be desirable to type a digit, the # sign and a period; #4. for example. Prior to the operation of the auxiliary keyboard to type 4, there is a preliminary automatic key stroke to type the # sign and after typing the numeral 4, a successive automatic key stroke effects the typing of the period. This period punctuation typing operation is a type of the "slide-out" operation.

Another object of the invention is to provide means to condition the punching machine so that multiple hole punching can be effected in a single column. It is desirable, for example, to perforate a column to represent a digit and also to punch out the O, X and R holes, respectively for control purposes. This object is attained in the present machine for not only effecting multiple card punching in a single column but to predetermine at will the number of columns in which such operations may be effected.

Additional miscellaneous but relatively important improvements will be noted as the specification is understood. All of these changes and improvements have been incorporated to refine the patented machines to meet the requirements and needs of commercial installations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view in front elevation showing the interconnected typewriter and card punching machine, the typewriter being shown upon a table which is in front of the operator so that an auxiliary keyboard K mounted adjacent the typewriter may be operated to cause the concomitant operation of the typewriter T and punching machine P. The typewriter is within access of the operator when it is desired to effect typing on a sheet in the typewriter by the auxiliary keyboard without punching the data on a card.

Figure 3A:
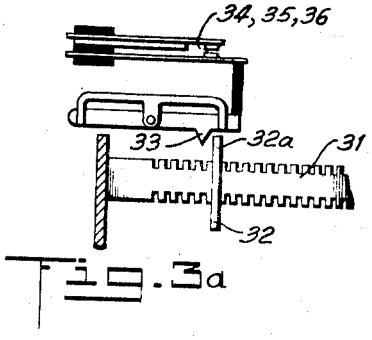

Fig. 3*a* is a detail view of a tabulator stop control mechanism for operating certain contacts employed in the present invention.

Figure 3B:
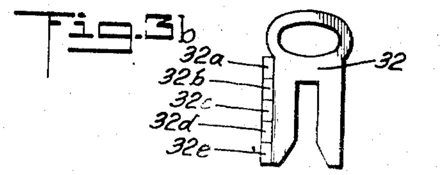

Fig. 3*b* is a detail view of a complete series of tabulating stops utilized in the present invention showing the manner of arranging the operating projections so that the latter will selectively operate the contacts shown in Fig. 3*a*.

Figure 4:
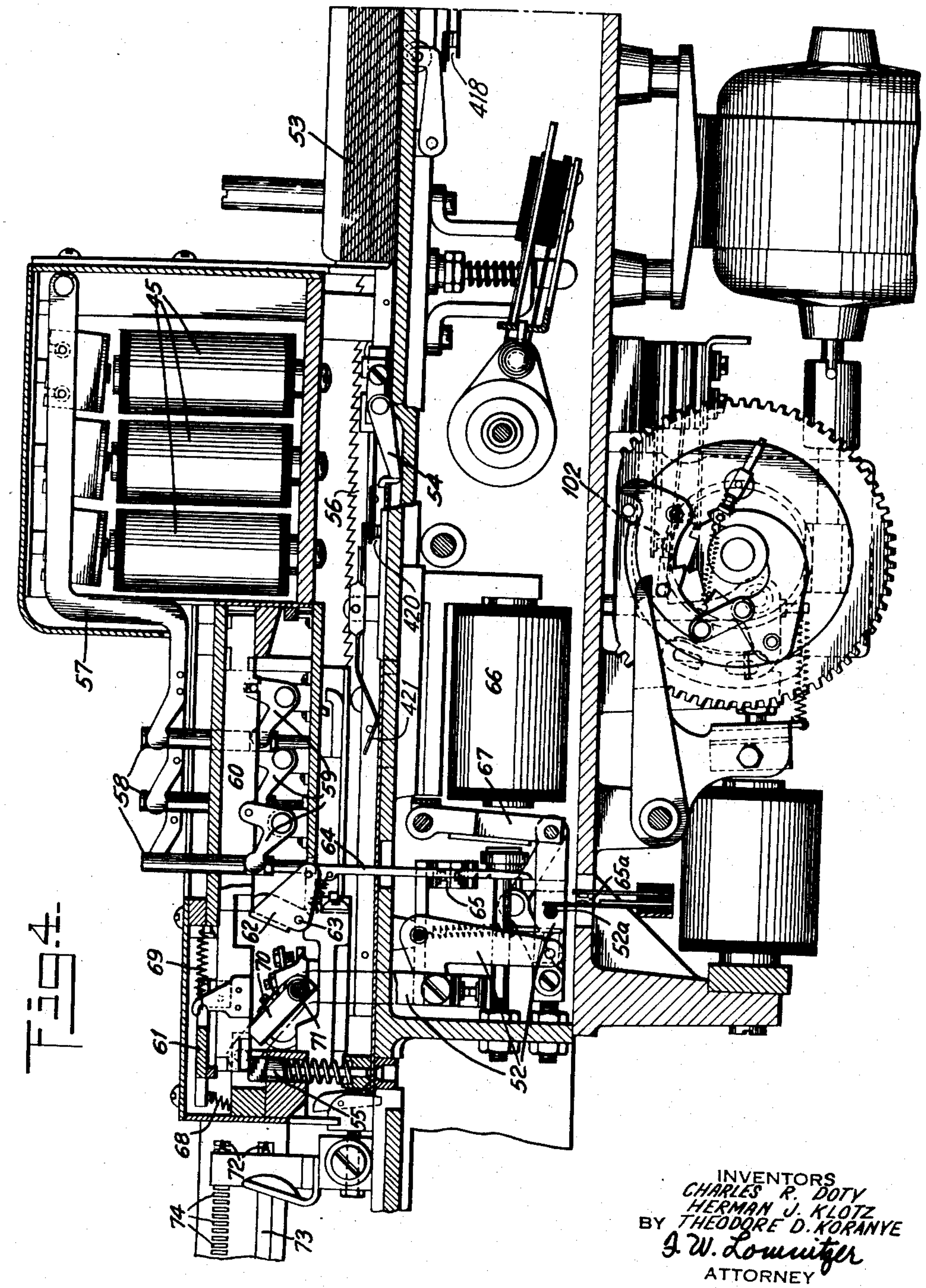

Fig. 4 is a longitudinal sectional view of a punching machine of a well known form and shows particularly the punch operating mechanism as well as the contact strip for effecting selective operations of the typewriter.

Figures 5, 6:
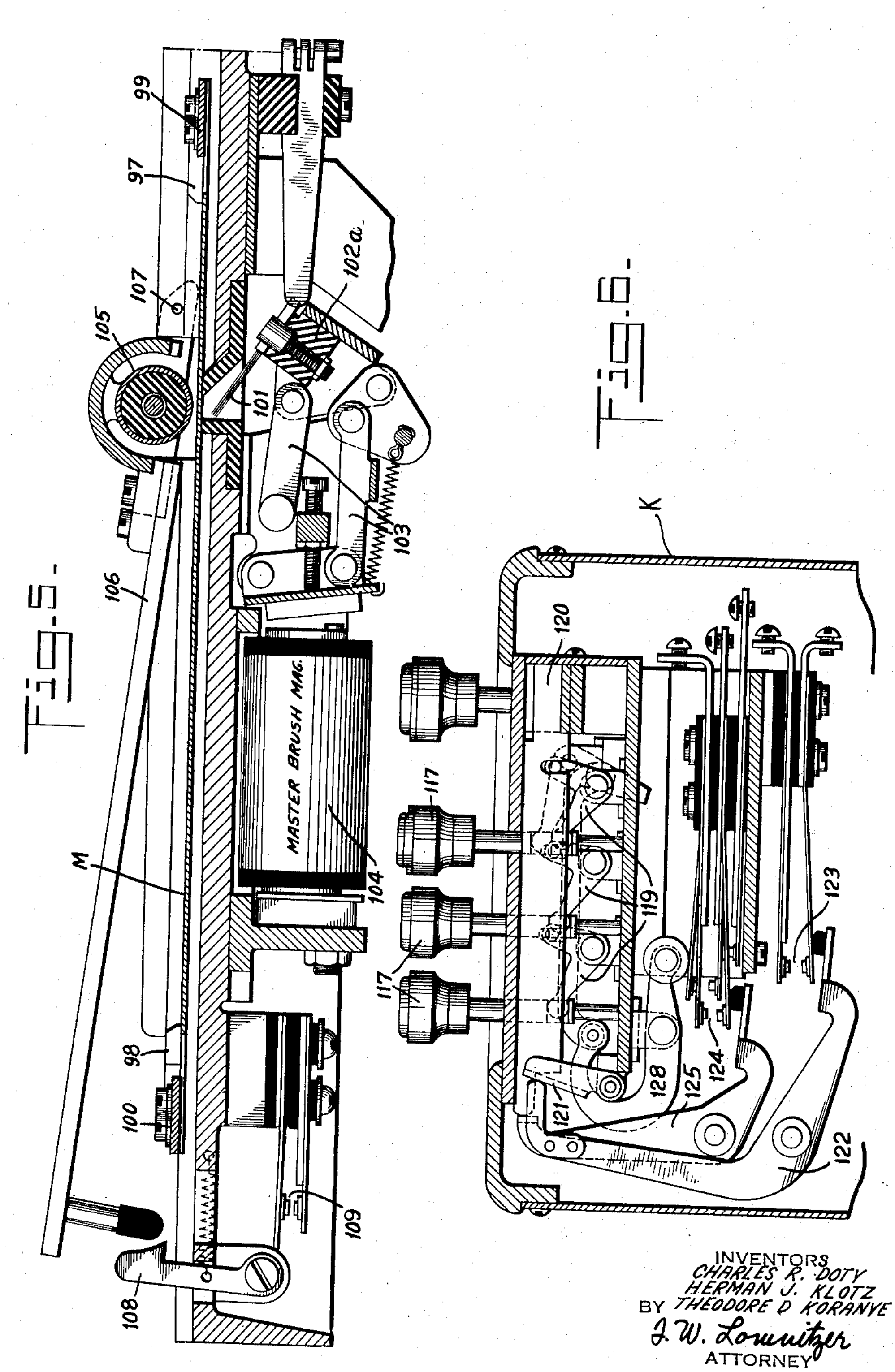

Fig. 5 is a detail view of part of the card punching machine and shows particularly the master card analyzing mechanism.

Fig. 6 is a detail view showing the internal contact operating mechanism controlled by the keys of the auxiliary keyboard.

Figure 7:
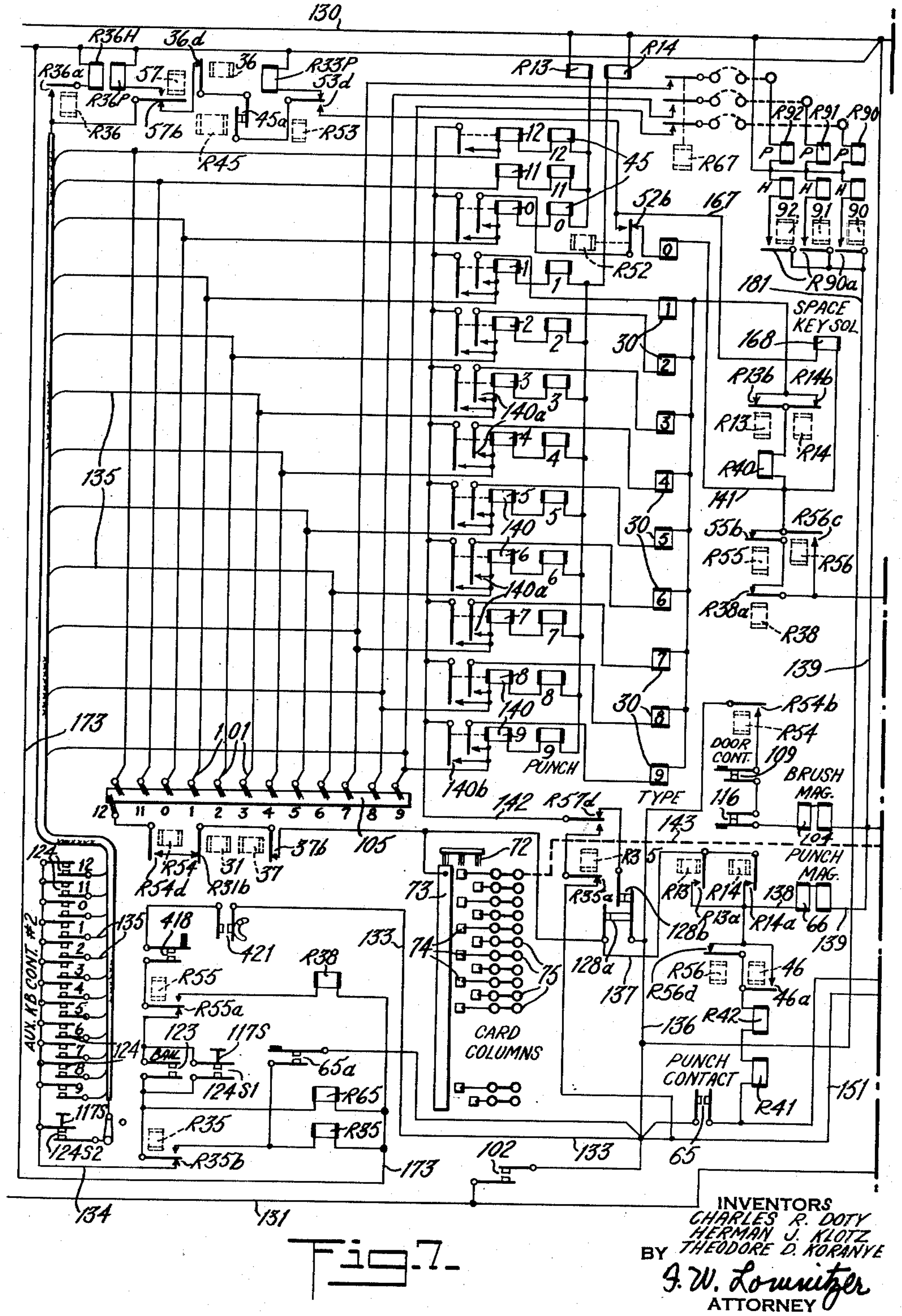
Figure 8:
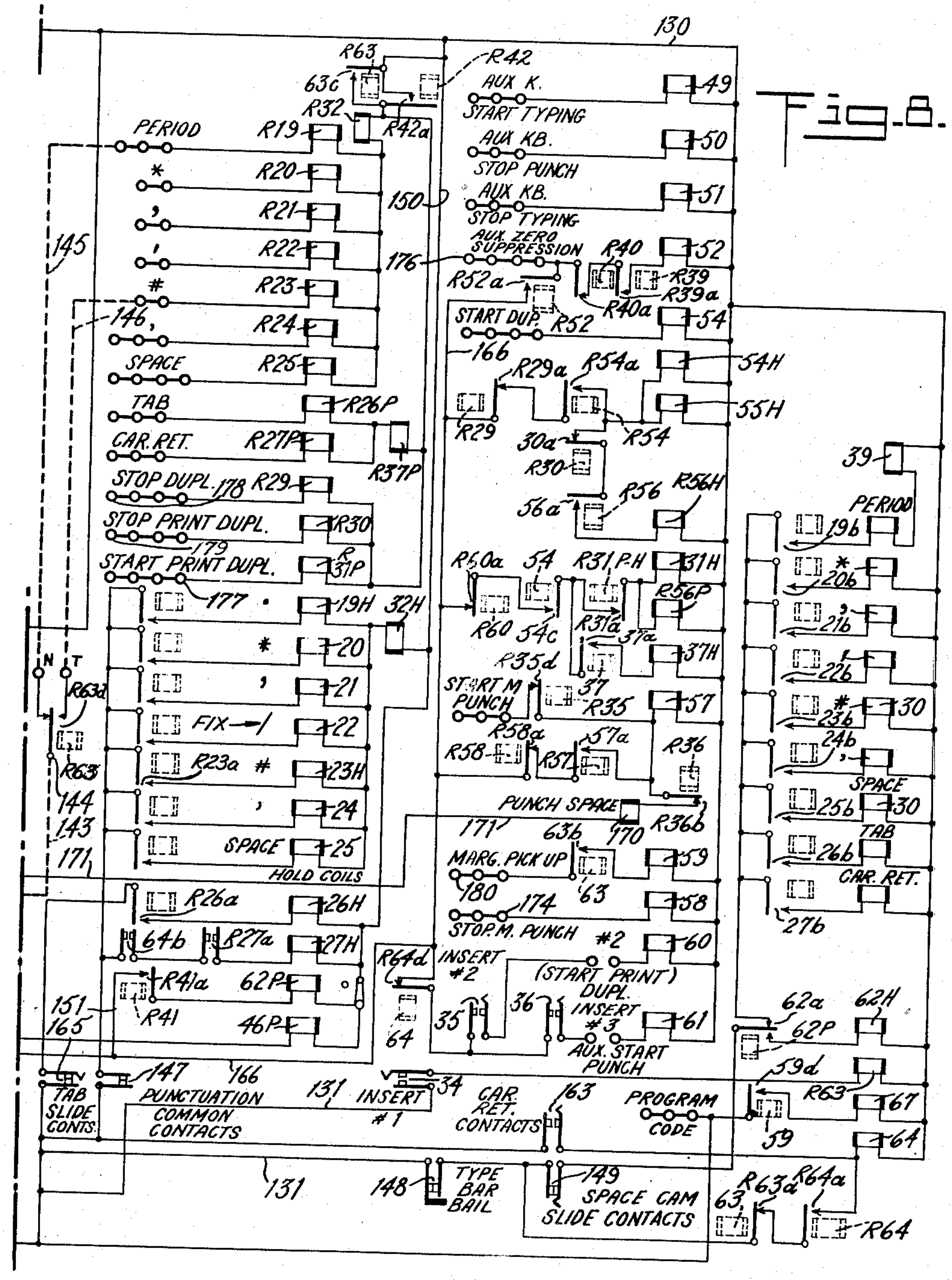

Figs. 7 and 8 when arranged in the order named represent the electrical wiring diagram of the machine.

Figure 9:
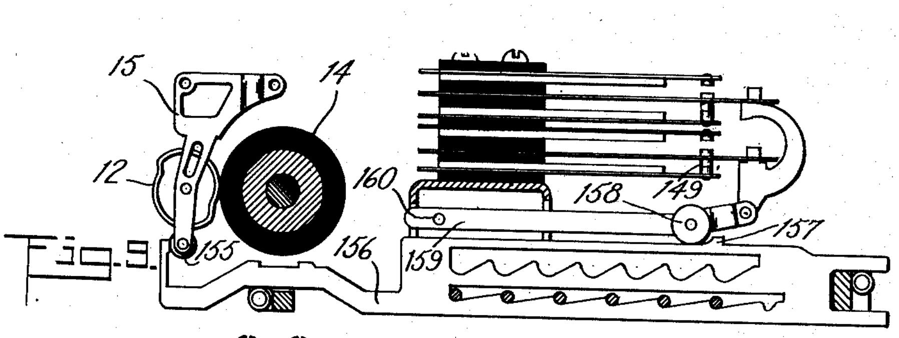

Fig. 9 is a detail view of the preferred construction for operating contacts by the cam unit of the typewriter.

Figures 10, 11, 12:
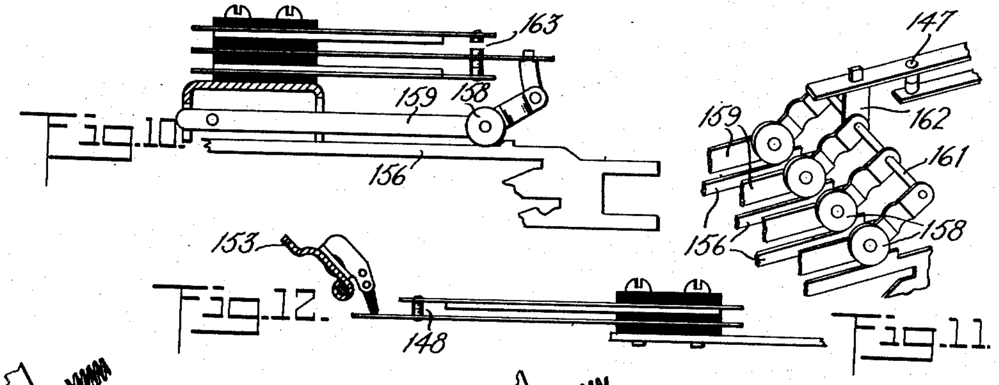

Fig. 10 is a view similar to Fig. 9 but shows the contact operating mechanism controlled by the carriage return and tabulating solenoids in the typewriter.

Fig. 11 is a detail view showing the manner of controlling contacts known herein as punctuation common contacts.

Fig. 12 is a detail view of the so-called type bar bail contact mechanism.

Figures 13, 14:
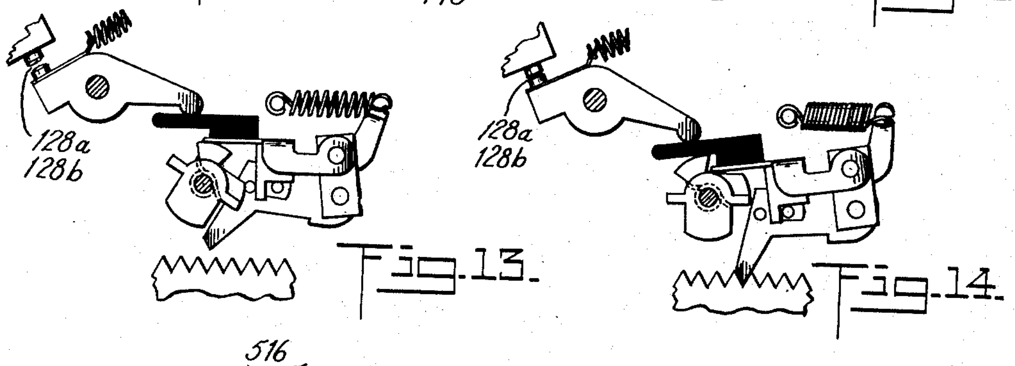

Figs. 13 and 14 are detail views showing the manner of operating the floating cam contacts in the card punch.

Figure 15:
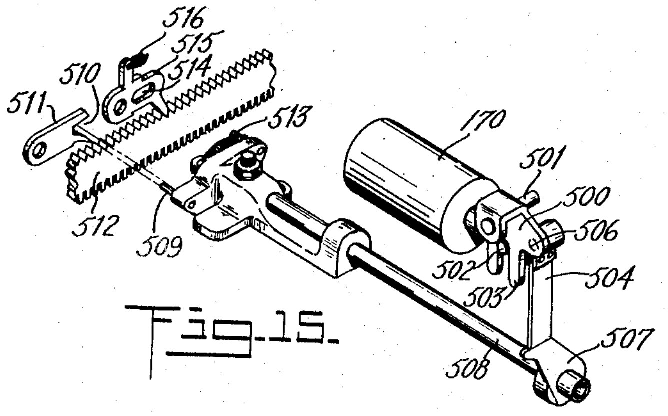
Figure 15A:
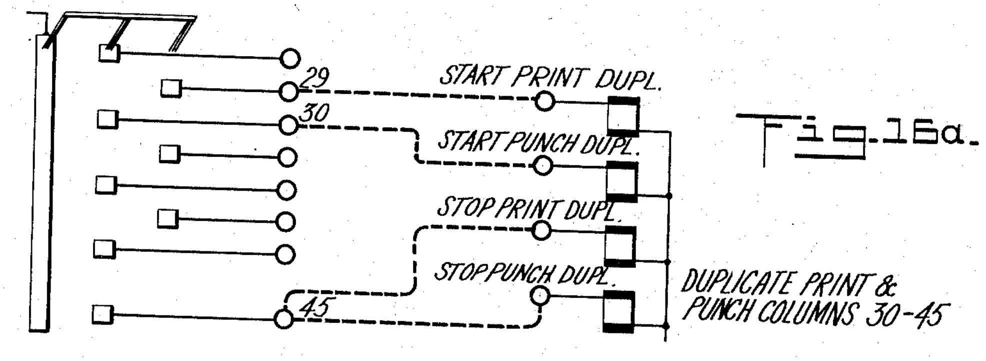
Figure 15B:
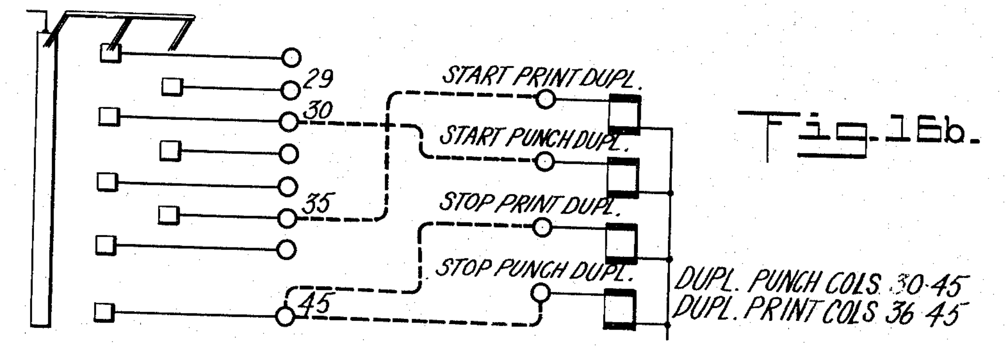
Figure 15C:
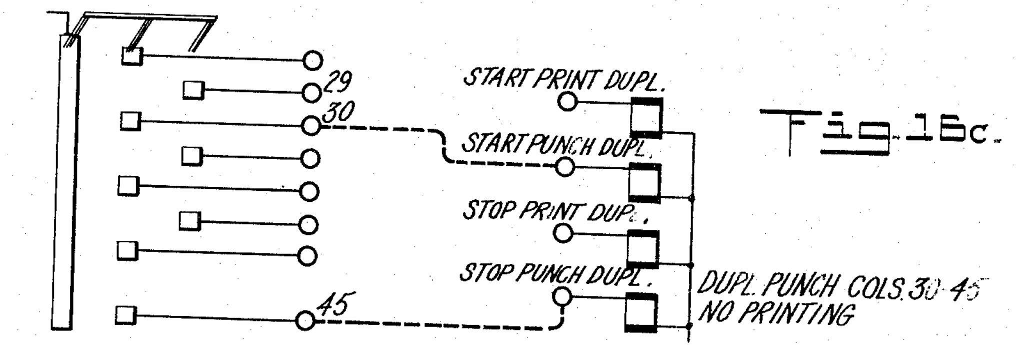
Figure 15D:
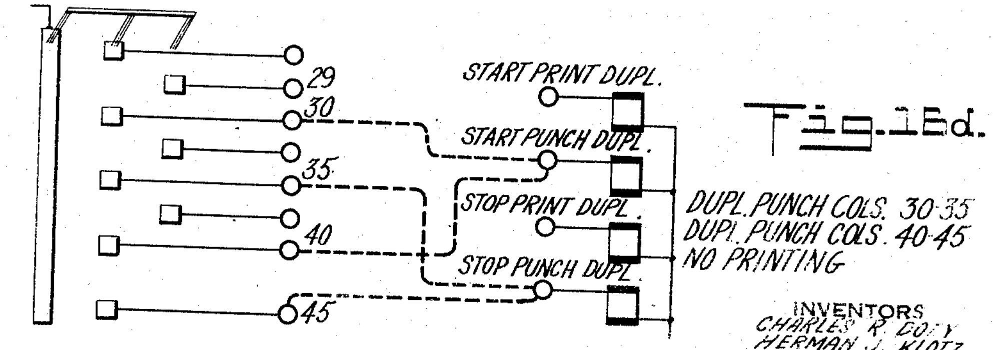

Fig. 15 is a representative view showing the manner of suppressing the operation of the escapement pawls when the card carriage is to be held for multiple hole punching in a column of a card.

Figs. 16*a*, 16*b*, 16*c* and 16*d* represent different plugging connections for the machine whereby punching and typing duplicating operations may be selectively carried out at different column positions of the card punch.

*The typewriter*

The typewriter for controlling the card punch is preferably constructed as shown in Patents Nos. 1,777,055 and 1,873,512 which is now on the market and known commercially as the "Electromatic," which is a product of the International Business Machines Corporation.

Figures 2, 3:
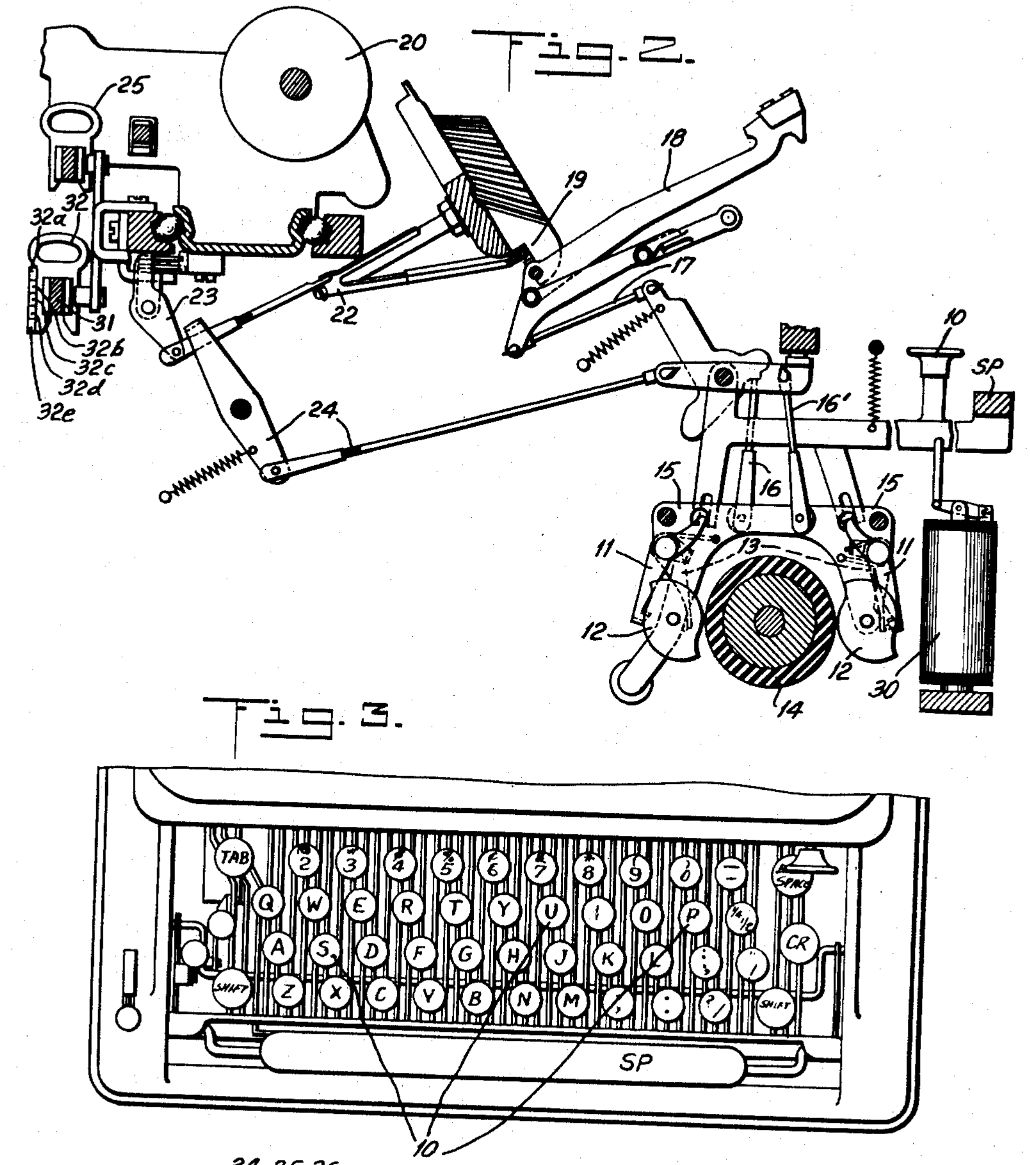
Fig. 2 is a sectional view through the typewriter, showing primarily the electromagnetic control of the type bar striking mechanism, the platen and the usual platen carriage of the typewriter.
Fig. 3 is a plan view of the front portion of the typewriter showing particularly the keyboard arrangement.

Fig. 3 shows the keyboard of which keys 10 are the alphabetic keys and other functional keys are shown, such as CR for carriage return, TAB, the tabulating key SP, space bar, special type or punctuation keys for punching a period (.), asterisk (*), apostrophe ('), diagonal (/), number sign (#), and a comma (,), these being principally used in connection with the present invention.

Briefly, referring to Fig. 2 a depression of the typing keys releases a latch 11 from a cam 12, permitting a spring-pressed lever 13 to move the cam 12 against the periphery of a continually rotating motor driven roller 14. The cam 12 is rotated by contact with the roller 14, causing the carrier 15 of the cam to rock in a direction for depressing a link 16 which, through linkage 17, propels type bar 18 carried by the basket 19 towards the platen 20 to effect typing from the type denoted by the operated key. During the final increment of the moving of the type bar 18 it strikes a universal bar 22 to actuate the escapement lever 23 for releasing the escapement mechanism to effect a carriage spacing movement. This is the operation which is effected for the typing keys.

Depression of space bar SP similarly results in the downward movement of link 16' to operate a linkage 24 for actuating the escapement lever 23 to effect a carriage or letter spacing movement.

The carriage return mechanism operated by key CR (Fig. 3) is of the type disclosed in Patent No. 1,955,614. As is usual, the carriage return movement is accompanied by a line spacing operation.

The tabulating mechanism operated by the key TAB is such as shown in Patent No. 1,935,436 and includes the usual settable tabular stops 25.

For actuation of the keys there are solenoids 30, one for the various keys to be operated under control of another keyboard or instrumentalities. In the present case the disclosure of the typewriter solenoids 30 is confined to the operation of the digit keys 0–9 inclusive and also for operating the above designated punctuation keys and the space bar. In general, energization of the solenoid 30 results in automatic operation of a key and the mechanism operated by the key whether it is a functional operation in the typewriter or a typing operation from selected type. In the wiring diagram to be described later there is shown the series of solenoids 30 and the designation affixed to each solenoid designates the particular key which is operated upon its energization.

Also mounted on the slotted rack 31 (Fig. 3*a*) which is carried by the carriage of the typewriter are marginal tabulator stops 32 which are fixed at desired positions on the rack corresponding to positions in which certain functions should take place when the carriage reaches such column positions.

The stops 32 are of different shapes and the five used in the present machine have projections 32*a*, 32*b*, 32*c*, 32*d* and 32*e* at different heights as is evident in Fig. 3*b*. These projections contact and operate levers 33 at certain column positions of the carriage. For the three TAB stops 32 utilized in the present wiring diagram there are related contacts 34, 35, and 36 which are closed by the related lever 33.

Figure 1:
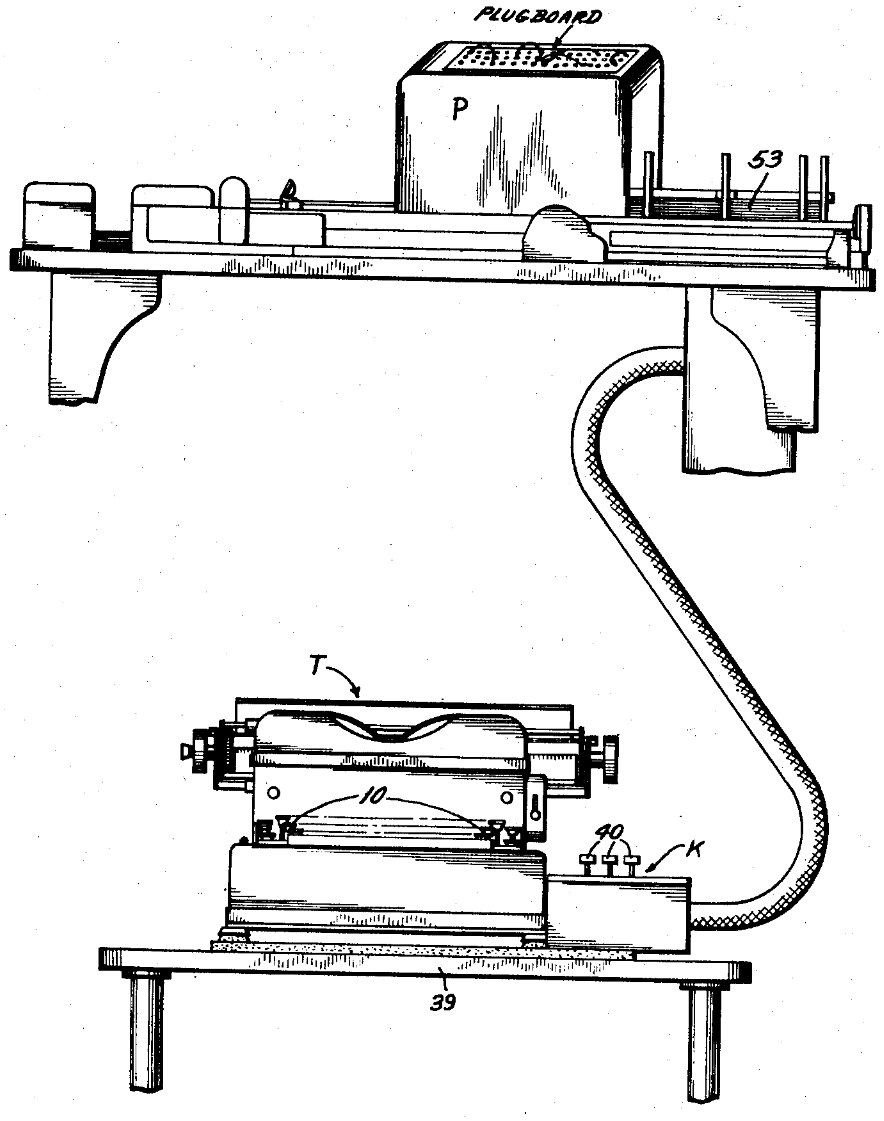

The typewriter T (Fig. 1) is shown mounted on a table 39 and adjacent the typewriter is an auxiliary keyboard K, the digit keys of which are operated to type on a sheet in the typewriter and to punch at the same time a card by means of a distantly or nearby located punch P.

*Auxiliary keyboard*

The auxiliary keyboard K may comprise the structure shown in the patent to O. B. Shafer, No. 2,315,741, issued April 6, 1943 and is also shown in Fig. 6 herein for convenience. The contacts closed by the keyboard are shown in the lower left hand corner of the wiring diagram of Fig. 7.

In the numerical keyboard there is provided a key 117 for each of the digits 0 to 9 inclusive and two keys designated 11 and 12 for punching corresponding X and R index point positions of a card in the punching machine. Also mounted on this keyboard are supplementary keys which include a space key 117S (Fig. 7). Depression of any key 117 will rock a bell brank 119 which, through a pin and slot connection, will move a slider 120 towards the left as viewed in Fig. 6. Each of the sliders cooperates at its end with a bail 121 to turn the same counterclockwise and the bail in turn will rock a lever 122 to close a pair of bail contacts 123. Bail contacts 123 are common to all of the keys 117 and are closed upon depression of all of said keys, except the space, tabulate, carriage return, skip and release keys, if these are provided on the auxiliary keyboard for convenient remote control of solenoids in the typewriter or punching machine which control the designated functions. Contacts 123 are shown in the wiring diagram in Fig. 7 as well as contacts 124 which are individual to each key and are closed upon depression of the key. There is one slider 120 for each of the keys, which slider is urged to the left upon depression of its associated key and for each slider there is a lever 125 which is rocked to close the associated pair of contacts 124. The key 117S operates a similar slider 120 and its lever 125 closes two pairs of contacts not shown in Fig. 6 but designated as contacts 124S1 and 124S2 in Fig. 7.

*Card punching machine*

The card punching machine used in connection with the present invention is of the type shown in the patent to Fred Lee and George F. Daly, No. 1,976,618, dated October 9, 1934 and only so much of the operation thereof will be explained as is necessary for an understanding of its operation in connection with the present invention.

In general, the punching machine contains a feed magazine 53 from which cards are fed singly from the bottom of the magazine as is well known by a picker which feeds the cards to a position under punches 55 and in the present machine the carriage is preferably returned to column 1 of the card to the punches, preparatory to receiving the perforations effected by the first manual punching operation. From this position the card is engaged at its rear edge by a pusher 54 mounted upon an escapement rack 56 which, for each operation of the punches permits the advance of the card step by step. A series of magnets 45 is adapted to select the punches 55 for actuation in the following manner: Associated with each magnet 45 is a pivoted armature 57 whose free end is connected to a rod 58 which, through a bell crank 59, moves an interposer bar 60 to the left in Fig. 4 where it cooperates with a punch bar or plate 61. The forward movement of the interposer bar 60 is adapted to rock a bail 62 pivoted on a rod 63 and which bail is connected to a spring pressed depending link 64 whose lower free end is adapted to engage and close the punch magnet contacts 65. This, as will be described in connection with the diagram, closes a circuit through a punch magnet 66 which then attracts its armature 67 and through a link and bell crank connection 52 will draw downwardly on the pivoted punch bar or plate 61 to force the selector interposer against the associated punch, thus perforating the card. When the armature 67 is attracted by punch magnet 66 a projection on the horizontal link 52 closes contacts 65*a*, which contacts are also shown in Fig. 7 of the wiring diagram. Such contacts are closed after perforating the card and before the punch carriage spaces to the next column position.

In the present machine the energization of the duplicating or punch selector magnets 45 of which there are twelve, one for the digit positions 0–9 inclusive and the 11 and 12 index point positions is under control of the keys of the auxiliary keyboard and the master card analyzing means.

As is fully shown in the patent to Lee et al., No. 1,976,618, when the armature 67 reaches the limit of its movement to the right the link 64 will be moved by a projection 52*a* to become disengaged from one of the spring blades of contacts 65 to permit such contacts to open, thereby deenergizing the punch magnet 66 which will then release its armature 67, allowing a spring 68 to rock the plate 61 upwardly and permit the selected interposer 60 to rise and thereafter be restored to normal position by a spring 69.

*Escapement mechanism*

The escapement mechanism 15 is shown herein in some detail in Figs. 13 and 14 but is fully shown and described in Patents No. 1,976,618 and No. 1,426,223. It will suffice to say that when an interposer 60 is depressed it will rock a bail 70 attached to a shaft 71 and the rocking of this shaft will actuate the escapement mechanism to space the card carriage a single column. Associated with the escapement mechanism are contacts 128*a* and 128*b* (see Figs. 7, 13 and 14). These contacts correspond to similarly designated contacts 128 in Patent No. 1,976,618. These contacts are normally closed but are opened by the escapement mechanism during the time that the card carriage is spacing to the next column position (see Fig. 13). When this column position has been reached, both of the contacts 128*a* and 128*b* close. (See Fig. 14.) Contacts 128*a* are in series with the duplicator circuit to prevent arcing at the master card analyzing brushes. Contacts 128*b* are utilized in other circuits to be subsequently described in connection with the wiring diagram.

*Column selector*

The column selector for the machine illustrated herein is also well known and is shown in the patent to George F. Daly et al., No. 2,016,706, dated October 8, 1935. As shown in Fig. 4 as well as Fig. 7, it consists of a movable contact brush 72 carried by the punch carriage engageable with a reading strip comprising a common contact strip 73 and contact points 74, some of which are connected by plug connections so as to cause certain functions to be performed when the carriage is at certain column positions in a manner to be subsequently explained. The contact points 74 are individually connected to plug sockets 75 of a plugboard shown in Fig. 7 and the plug sockets are serially numbered 1–80, corresponding to the column positions of the card carriage.

*Master card sensing mechanism*

The machine shown herein is provided with a master card sensing mechanism so that certain data on the master card may be duplicated on the blank card coordinated with the card punching mechanism and this data may be reproduced on the typewriter according to the selective setup in the machine.

Referring to Fig. 5, a master card designated M may be placed in the machine in parallel alignment with the card to be punched. The master card is held in position between a pusher 97 and a forward guide 98 which are carried by cross arms 99 and 100 respectively, which arms are extended from the escapement rack 56.

The card M is manually placed in position and travels back and forth with the card carriage. The operation is such that the card is advanced step by step past a set of brushes 101 as each of the columns of the card C pass their punching position. Brushes are provided for sensing the digit positions 0–9 and also the index point positions 11 and 12. The 11 and 12 index point positions of the card are punched but, of course, there is no printing of such indications by the typewriter.

The brushes 101 are mounted on an insulating block 102*a* and are moved vertically into contact with the card through linkage generally designated 103 which is controlled by the brush magnet 104. The cooperating contact roller 105 is supported in the gate or door 106 which is pivoted at 107 and which, when the master card has been placed in position, is rocked downwardly into closed position where it is held by a spring-pressed latch 108. The free end of the gate is provided with a plunger which effects closure of the so-called door contacts 109 (see Fig. 7).

Also associated with the energizing circuit of the brush magnet are the so-called cutout contacts 116 shown in the wiring diagram of Fig. 7. The means for operating these contacts is fully shown in the aforementioned patent to Shafer, No. 2,315,741 and in view of this disclosure reference may be had to this patent for further information. These contacts are in the brush magnet energizing circuit and together with the door contacts 109 are provided to insure that the brush magnet is deenergized and the related brush is in down position when the door is open or when the carriage is manually back-spaced. These interlock contacts insure that the brushes 101 are in down position to prevent their injury by back-spacing the card.

*Printing and punching under control of the auxiliary keyboard*

The operation of the machine will now be given mainly in connection with the wiring diagram of Figs. 7 and 8 and there will now be described the circuits which are operative for causing punching of a card and typing by the typewriter under control of the auxiliary keyboard K. As previously described, when the digit keys of the auxiliary keyboard are operated the individual contacts 124 (Fig. 7) will be closed as well as the bail contacts 123. Closure of contacts 124 will select duplicating or punch selector magnets 45 for energization. Current is supplied by the power supply lines 130, and 131 and many of the circuit connections are completed through contacts 102 (Fig. 7) which are well known latch contacts in the card punching machine. When a key is depressed a circuit will be completed from the line 131, through latch contacts 102 which are closed during key operations, wire 133, through punch bed contacts 421 and through the magazine contacts 418. These two last mentioned contacts correspond to the similarly designated contacts in Patent No. 2,285,289, and contacts 421 are shown in Fig. 4 as well. As long as there are cards in the supply magazine contacts 418 (Fig. 4) are closed and when a card is in position on the card carriage contacts 421 are closed. The circuit then extends from contacts 421 and 418 through normal transfer relay contacts R55*a*, thence through bail contacts 123, through transfer contacts R35*a*, at normal, thence to a wire 134 which is connected to one side of all the key operated contacts 124. The closure of said contacts 124 by the operated key will then extend the circuit through the individual connecting wire 135 in a cable to the corresponding punch selecting magnet 45. The wiring connection from the other side of the duplicating or punch selecting magnets 45 is through the R14 relay to the line 130 for punch selecting magnets 1–9 inclusive, and for duplicating or punch selector magnets 0, 11 and 12 the circuit is completed to line 130 through the R13 relay. Punch selector magnets 45 will now shift the related interposer 60 (Fig. 4) to select the desired punch 55 for operation.

The circuit to energize the punch magnet 66 to actually effect the punching operation is from the line 131 through latch contacts 102, punch magnet contacts 65, through relays R41 and R42, through normally closed contacts R56*d*, wire 138, punch magnet 66, wire 139 to line 130. Punch magnet 66 then attracts its armature 67, opening punch magnet contacts 65 and deenergizing relays R41 and R42. A supplemental circuit is provided to maintain punch magnet 66 energized for time determined by the closure of floating cam contacts 128*a*. This circuit extends through either relay contacts R13*a* or R14*a*, wire 137, floating cam contacts 128*a*, wire 136, latch contacts 102, to line 130.

When it is desired to effect typing concomitantly with card punching the typewriter operating solenoids 30 are energized. In series with each punch selecting magnet 45 is a relay magnet 140 which is energized concurrently with the punch selecting magnet 45. Each relay 140 closes its respective contact 140*a* to extend the impulse circuit from the key contacts 124 relating to keys 0–9 to the typewriter solenoids 30. It will be noted that only 0, 1–9 relays 140 cause the energization of the corresponding typewriter solenoids 30. The circuit for the 1–9 type bar solenoids 30 is completed through R13*b* and R14*b* contacts in parallel with each other, through the R40 relay, thence through relay contacts R55*b*, relay contacts R38*a*, both of which are normally closed, thence to line 130. The energizing circuit for the 0 typewriter solenoid 30 extends from the relay contacts 140*a* pertaining to the 0 relay 140, thence through relay contacts 52*b* now normal, to the 0 typewriter solenoid 30, and thence by a wire 141 to the relay contacts R55*b*, through relay contacts R38*a*, to the line 130.

A holding circuit is provided for the relays 140 which extends through the respective contact 140*b* to a line 142, thence through relay contacts R57*d*, through the floating cam contacts 128*b*, wire 136, latch contacts 102 back to line 130. Therefore, these relays are retained energized until the floating cam contacts 128*b* open which is when the card carriage has skipped to the next column position. The circuit for the typewriter solenoids 30, 1 to 9, inclusive, is opened when relay contacts R13*b* and R14*b* open.

*Multiple typing and single column punching at margin position of typewriter and card punch*

It is frequently desirable to effect multiple typing at the left margin of the sheet in the typewriter which comprises special signs at the left and right of a digit typed by depression of a key of the auxiliary keyboard. For example, it may be required to type #5. and to punch in the first left hand column of the card the digit 5 only. This is merely illustrative and by variations in plugging other typing can be effected.

The # and . are typed automatically and preferably by the following circuit arrangement:

In a manner disclosed in the aforementioned Doty patent, No. 2,318,299, the CR carriage return solenoid is energized which returns the typewriter platen carriage to the left hand margin position and at such position insert contact 34 #1 closes (see Fig. 8) and picks up R63 relay by an obvious circuit. This transfers contacts R63*d*. It will be noted in the circuit diagram that for illustrative purposes a plug connection 143 (Figs. 7 and 8) is made from the #1 column readout plug socket 75 to a plug socket 144 connected to the center blade of contacts R63*d* and individual plug connections are made from 145, 146 plug sockets of the R63*d* contacts to plug sockets connected to the period control relay R19 and # sign control relay R23, respectively.

After punching operations for a card are completed, the carriage is returned by circuits fully described in the last mentioned Doty patent and the punched card is ejected in the normal manner and, as is well known, latch contacts 102 close. A circuit is now completed from line 131 through latch contacts 102, wire 136, floating cam contacts 128*a*, common contact bar 73, brush 72 at column 1 position to the contact point 74 of column 1, associated plug socket 75, plug connection 143 to plug socket 144, through transferred contact 63*d*, plug connection 146 to the R23 relay, the circuit for R23 relay being completed through R32 relay, R63*c* contacts now closed to line 130. R23 relay closes the R23*a* contacts and a holding circuit for the R23H coil is effected through such contacts through the normally closed punctuation common contacts 147 (Fig. 11) to line 131. The R23 relay closes its R23*b* contacts and a circuit is completed from line 131, to the normally closed type bar bail contacts 148, (Fig. 12) through the normally closed space slide contacts 149, R62*a* transfer relay contacts now normal, through R23*b* contacts, the # sign printing control solenoid 30, to line 130. This will effect the operation of the # sign typewriter key and this will be printed at the left hand margin of the sheet in the typewriter and the typewriter carriage moves in the usual manner out of the left hand margin position and #1 insert contact 34 opens to drop out the R63 relay. R63*d* contacts transfer to normal and the R63*a* contacts open.

The hold circuit for the hold coil of R23 relay, and in fact for the relays R19–25, is through the contacts 147. The manner in which these contacts are opened is best shown in Figs. 11 and 13. Each of the punctuation typing keys for typing the . * , / # ' is operable by the cam unit shown in Fig. 2 and the carrier 15 has a roller 155 which shifts a related slide 156 which has a cam projection 157 cooperating with a roller 158 carried by an arm 159 pivoted at 160. Now referring to Fig. 11, each arm 159 is connected by a rod 161 and said rod carries a member 162 for opening the contacts 147. Thus, the operation of each of the described punctuation keys opens the hold circuit for the hold coil of the energized relay.

The punch carriage is at normal position and although R63*d* contacts (Fig. 8) transfer to normal, no circuit connection is completed to R19 relay at this time because both R63*a* and R42*a* relay contacts are open. The printing of the # sign is an indication to the operator that the digit 5 is to be now recorded on the sheet in the typewriter and punched on the card and accordingly the #5 key of the auxiliary keyboard is operated and by the circuits previously described the 5 punch selecting magnet 45 and the 5 typewriter solenoid 30 are energized. This will effect concomitant typing and punching of the digit 5 on the sheet in the typewriter and the card respectively. In this operation of the punching machine the R42 relay is energized and the R42*a* contacts close (top of Fig. 8) and thus complete the circuit to the R19 relay which is through the R63*d* contacts now normal and plug connection 145. R19 relay closes its R19*a* relay contacts, effecting a holding circuit for the R19H winding through punctuation common contacts 147, as before. Relay R19 closes its R19*b* contacts to pick up the period solenoid 30 but the circuit is not completed at this time in order to provide a desired sequential operation between the 5 digit type bar and the period type bar to prevent any conflict. When the R41 relay is energized as a result of the digit card punching, as previously described, the R41*a* contacts (lower left of Fig. 8) close to complete a circuit from the line 130, wire 150, through the pickup winding of the R62 relay, R41*a* contacts, wire 151, latch contacts 102 to line 131. R62P coil (lower right, Fig. 8) transfers the R62*a* contacts which thus opens the energizing circuit for the period control solenoid 30. A hold circuit for the R62H relay (lower right, Fig. 8) which is picked up by transfer of R62*a* contacts is provided through R62*a* contacts now transferred, the space cam slide contacts 149, type bar bail contacts 148, to line 131. After typing 5 the type bar bail contacts 148 open, thus deenergizing the R62H coil and contacts R62*a* transfer back to normal. When the type bar bail contacts 148 close the energizing circuit is now completed to the period control solenoid 30 and the period is typed after the digit 5.

The type bar bail contacts 148 are normally closed but open at each typing operation by means of the arrangement shown in Fig. 12. Plate 153 is the well known universal member provided for moving the ribbon in the well known Electromatic typewriter, and corresponds to element 31 of Patent No. 1 950,762.

Summarizing, the above circuit arrangement provides for the typing of two signs by automatic key strokes and the intermediate digit by a manual operation. After punching the digit 5 the punch carriage escapes to the next column position and correspondingly the platen spaces to the next typing position on the sheet.

*Slide-in and slide-out operations*

Herein the present machine provides for automatic typing or control functions which are set in operation by plugging connections from the column readout of the punch and comprise operations which fall into two groups. The first group comprises so-called "slide-in operations" which are operations initiated as the brush of the readout moves into a column position. The second class of automatic operations are those which are not initiated immediately upon the brush of the readout sliding into a column position where a plug connection may have been made for that column but are to be initiated on moving out of a column position. In this group are the operations which are effected for typing punctuation or selective marks after digit typing. While the previous chapter described an automatic operation of this class, nevertheless the repeated description will be given.

*Slide-out operations*

This group includes the solenoids R19 to R25 which, when energized, perform the function designated by such relays. If, for example, it is desirable to print a period, diagonal line, asterisk, etc. or even effect a spacing operation after a number has been typed in a column of the sheet, a plug wire is made from the column readout to the selected relay. If, for example, a period is to be typed after a number is typed in column 10, a plug connection is made from column 10 of the readout to the plug socket of the period relay R19 so that as the card carriage spaces from column 9 to column 10 a circuit is completed to the period typing control relay R19, in the assumed example. However, the energizing circuit of this relay is incomplete by reason of relay contacts R42*a* which are, at the present time, open.

When the auxiliary keyboard is operated the desired digit will be typed and punched on the card and by circuits previously described relays R41 and R42 are picked up. R42*a* closes to energize the R19 relay and its holding circuit is completed by the R19*a* relay contacts and the punctuation common contacts 147. R19*b* contacts will close to complete the circuit at this point to the period control solenoid 30 but the circuit will be open at R62*a* relay contacts which transferred as a result of the R62 relay having been picked up by the R41*a* contacts. R62H coil is held through R62*a* relay contacts now transferred, the space cam slide contacts 149 now closed and the typewriter bail contacts 148. When the typewriter is operated to print the desired type, the type bar bail contacts 148 open (Fig. 12) as previously described and R62H coil deenergizes and R62*a* contacts transfer back to normal. When the type bar bail contacts 148 close after typing the desired digit a circuit is now completed through the R19*b* contacts, the period control solenoid 30, R39 relay to the line 100. Thus, the energization of the period control solenoid will effect the operation of the typewriter key for causing the period to be recorded after the printed digit. When the punctuation common contacts 147 open the hold circuit for the R19 relay will be broken.

In this same group are tabulating and carriage return operations controlled by relays R26 and R27 which obviously should be effected after recording of a digit. These control functions are delayed by reason of the opening of contacts R62*a* so that the energizing circuit for the solenoids 30 controlled by the "*b*" contacts of such relays R26 and R27 cannot be completed until after the typing operation.

The holding circuit for the holding coil of R27 relay is through its R27*a* contacts, relay contacts R64*b*, the punctuation common contacts 147, back to the line 131. The R27 relay closes its R27*b* contacts to pick up the carriage return solenoid 30 which thus operates the carriage return key and the carriage return mechanism of the typewriter returning the platen carriage to the left hand position. When this solenoid is energized the typewriter cam unit shifts a slide 156 (Fig. 9) and in the manner previously described causes the carriage return slide contacts 163 (Fig. 10) to close, thereby picking up relay R64 by an obvious circuit in Fig. 8 and which relay holds through the R64*a* contacts, R63*a* contacts and the type bar bail contacts 148 back to line 131. The carriage return slide contacts 163 are specially controlled and are controlled by a toggle so as to open at the end of the carriage return movement. This toggle comprises link 72 of the typewriter shown in Patent No. 2,200,767, and therefore, is well known. The deenergization of relay R64 at the end of the carriage return will open relay contacts R64*b* to break the holding circuit of the holding coil of R27 relay. Incidentally, the R64*d* contacts open the energizing circuit to the R60 and R61 relays through the respective insert contacts #2 and #3, 35 and 36, and thus prevent these relays from being picked up, although these insert contacts 35 and 36 may be closed during the return movement of the carriage.

With regard to the tabulating control relay, which is the R26 relay, it will be noted that its hold circuit for the R26H coil is through its R26*a* contacts and the tabulator slide contacts 165 back to line 130. When the TAB solenoid 30 is energized by the closure of the R26*b* contacts the cam unit operates a slide like slide 156 (Fig. 9) but arranged to open contacts 165 which break the holding circuit for the R26H coil.

In the delayed operation group are operations controlled by R29, R30 and R31 relays, which effect operations delayed by the opening of contacts R42*a*. The controls effected by such relays will be subsequently described in connection with master card control of duplicating operations described in the chapter headed "Printing and Punching Data Represented by Master Card on Typewriter Sheet and Card, Respectively."

*Slide-in operations*

In contrast to the operations just described the present machine has provisions for effecting other operations which are initiated immediately as the column readout spaces to the next column position. These relays are designated R49, R50, R51 and R52, (Fig. 8), it being evident that by selective plug connections from the column readout socket 75 to the desired one of such relays they are picked up immediately upon the spacing of the column readout to the next column position. In other words, if relay 49 is selected for energization as the column readout moves into the column from which a plug connection has been made, relay R49 will be picked up so that when punching is effected in the next column, typing operations will be initiated under control of the auxiliary keyboard. On the other hand, if the R50 relay was picked up punching would not be effected for the column to which the column readout spaces. Energization of the R51 relay will terminate typing operations for the column that the column readout moves into which corresponds to the plug socket of the column readout having the plug connection to the R51 relay.

The circuit diagram does not include the various controls by relays R49, R50 and R51 since there are corresponding relays in the patent to Doty, No. 2,318,299 in which complete information as to the manner in which the functions are performed may be found.

*Zero suppression*

The R52 relay is a relay of the type in which operations are initiated immediately upon the column readout moving into the next column position. Upon picking up the R52 relay (Fig. 8) a hold circuit will be made through R39*a* relay contacts, R40*a* relay contacts, R52*a* relay contacts now closed, wire 166, wire 151, back to line 131. Referring to Fig. 7 (upper right hand), the R52*b* contacts transfer so as to transfer impulses which would normally be directed to the 0 typewriter solenoid 30 to be directed by wire 167 to the space key solenoid 168, the circuit to line 130 being completed through 55b and R38 relay contacts. Thus, instead of printing zeros in the left hand column positions the platen typewriter carriage is merely spaced, thus suppressing typing of zeros. The present machine has two space solenoids 168 (Fig. 7) and 30 (Fig. 8) to operate two different space levers in the typewriter keyboard. The automatic space solenoid 30 operates a lever which is without a key top and acts directly upon the universal bar controlling the type carriage bar escapement mechanism. The zero suppression can be terminated by typing a significant digit to pick up R40 relay (Fig. 7) to open contacts R40a, or by printing a period and picking up R39 relay and opening R39a relay contacts.

*Means to effect multiple hole punching in each card column*

Occasionally there is a requirement for perforating a card column with more than one hole since it is desirable, for example, to perforate the column to represent a digit and also to punch out the 11th or 12th index point positions which respectively denote X and R.

The present machine incorporates a selectively operated arrangement which controls double punching for not only a single column but also for a plurality of columns. According to the first column where multiple punching is to start, a plug connection is made from the desired plug socket 75 (Fig. 7) to the plug socket of the R57 relay, (Fig. 8) thus completing an energizing circuit through normally closed R35d relay contacts at this card column position of the carriage. A hold circuit for the R57 relay is made through the R57a contacts, R58a contacts now closed, wires 166, 151, back to line 131 through the latch contacts 102. Also, through the R36b contacts the energization circuit to the space solenoid 170 is completed through wire 171, wire 139 (Fig. 7) to line 130. Energization of the multiple punch control solenoid 170 (see Fig. 15) operates the escapement mechanism so that the holding dog is held down to prevent escapement to the next column.

The punch space solenoid 170 moves a bell crank lever 500 clockwise about its pivot stud 501, the plunger of the solenoid having a pin 502 engaging in a slot 503 of the bell crank. A thrust bar 507 pivoted at 505 to the bell crank 500 rocks counterclockwise an arm 507 on the escapement dog control shaft 508. A pin 509 on a casting secured on this shaft engages in a slot 510 of the escapement dog 511 and rocks this dog into engagement with the rack bar 512. At the same time a pin 513 engaging an elongated hole 514 of the second escapement dog 515 lifts the latter out of engagement with the rack bar and allows it to jump forward over the next tooth of the rack bar, under the force of spring 516. The rack bar is thus locked until the multiple punch solenoid is deenergized.

However, when this solenoid 170 is deenergized its release will enable the escapement mechanism to operate in the regular way to space to the next column. The transfer of the R57b contacts (Fig. 7, upper left) transfers the energizing circuit from the space key 117S to the R36P coil. R57d contacts (Fig. 7) transfer to thus transfer the duplicating relay hold circuit through the R35a contacts and the latch contacts 102 back to line 131. The machine has now been conditioned for enabling multiple card punching in a column. The first digit key of the auxiliary keyboard is depressed and in the manner explained the punch magnet 66 will effect the desired digit punching. Energization of the punch magnet 66 effects the closure of the armature contacts 65a and a circuit will be completed from line 131 through latch contacts 102, transferred armature contacts 65a, R35 relay, and wire 173 to line 130. A hold circuit for the R35 relay is maintained through the transferred R35b contacts, bail contacts 123, R55a contacts, magazine contacts 418, punch bed contacts 421, wire 133, latch contacts 102 back to line 131. When R35 relay energizes for each digit key operation and space key operation the R35d contacts (Fig. 8) open to open the energizing circuit of the R57 relay but the latter is still energized by its holding circuit. The second digit key depression of the auxiliary keyboard is now made by the operator and a repetition of the above operations occur. After multiple punching in a card column the space key of the auxiliary keyboard is operated and recalling that the R57b contacts (Fig. 7, upper left) are now transferred, depression of the space key 117S will complete a circuit from line 131 through latch contacts 102, punch bed contacts 421, magazine contacts 418, R55a contacts, auxiliary space key contacts 124S1, R35b contacts, space key contacts 124S2, through R57b contacts (Fig. 7, upper left) now transferred to R36P, coil to line 130. The hold circuit for the R36H coil is effected through the R36a contacts, the space key contacts 124S2, R35b contacts, auxiliary keyboard space contacts 124S1, R55a contacts, magazine contacts 418, punch bed contacts 421, latch contacts 102 to line 131. The R36b contacts open the circuit to the punch space solenoid 170 to release the escapement mechanism and the card spaces to the next column. When the space key 117S is released the R36 relay drops out to again condition the machine for effecting multiple card punching on the second column. In the above manner one or more successive card columns can each be multiple punched and in the last column of the field a plug connection is made from such column plug socket 75 to plug socket 174 of the R58 relay (see Fig. 8). The latter opens the R58a holding contacts, thus deenergizing the R57 relay and restoring the machine to a condition for enabling single column punching for successive columns.

*Printing and punching data represented by master card on typewriter sheet and card, respectively*

It is frequently desirable to reproduce on the sheet in the typewriter and also upon the blank card in the punch data represented by the master card which, it is recalled, is analyzed by the master card analyzing means comprising brushes 101 and associated contact roll 105, (Fig. 5). The initiation of such functions is under control of the column readout of the punch and if it is desired to start duplicating operations in card column 30, for example, of the card, a plug connection is made from the correspondingly numbered plug socket 75 to the plug socket 176 (Fig. 8) designated "Start punch duplicate." When the column readout brush slides into this position an energizing circuit to the R54 pickup coil (Fig. 8) is completed immediately upon the column readout brush 72 sliding into contact position after an operation in column 29. When it is desired to also print this data a plug connection is also made from plug socket No. 29 to a plug socket 177 (Fig. 8) designated "Start print duplicate" to thereby energize the R31P relay coil after the R54P relay coil has been energized. The "Start print duplicate" control is the delayed operation type since R31P relay is in series circuit with R42*a* contacts and further in the present machine a "Start print duplicate" operation is initiated after a tabulation or any movement effected by typing, tabulating, spacing, carriage return, etc. to a position to close Insert #2 contacts 35. Therefore, a plug connection is made from the plug socket 75 of column No. 29 to the "TAB" plug socket to pick up the R26 and R37 relays. The R26 and R37 relays are energized when the column readout slides into column 30 position and R26 relay is held through its respective R26*a* contacts and the TAB slide contacts 165 as previously described.

Considering now the R54 relay (Fig. 8) when the latter is picked up at column 30 position, it will close its respective contacts R54*a* (Fig. 8) thereby closing the energizing circuit for the R54H relay through the R54*a* contacts and R29*a* contacts now closed. At the same time, the R55H coil in multiple with the R54H is energized. Both of these relay coils are maintained energized until the termination of the punching duplicating operations when R29 relay coil (Fig. 8) is picked up to open the respective R29*a* contacts. R55*b* contacts (Fig. 7, right center) open to break the return circuit of the typewriter solenoids. R54*b* contacts (below R55*b*) close to complete a circuit to energize the brush magnet 104 from the line 130 through brush magnet 104, column cutout contact 116, door contact 109, R55*b* contacts, wire 136, latch contacts 102, to line 131. Energization of the brush magnet 104 (Fig. 5) will lift the master card analyzing brushes 101 in contact with the contact roll 105.

Concurrently the R54*d* contacts (lower left, Fig. 7), close to complete the circuit to the contact roll 105. The R55*a* contacts (Fig. 7, lower left) are transferred to open the energizing circuit under control of the auxiliary keyboard contacts 124 to prevent misoperations in the event the auxiliary keyboard is operated during duplicating operations. The transfer of such contacts R55*a* completes a circuit from line 131 to latch contact 102, wire 133, punch bed contacts 421, the magazine contacts 418, R55*a* contacts now transferred, R38 relay, wire 173 to line 130 to energize R38. R38 opens R38*a* contacts (Fig. 7, right center) to open the return circuit for the typewriter solenoids even though R56*c* contacts, which are in shunt with R55*b* and R38*a*, are closed, as will be presently described.

Referring now to Fig. 8, R54 relay closes the R54*c* contacts to complete a circuit from the line 130 through R31H and R56P in multiple with each other, through R31*a* relay contacts now closed as a result of the energization of R31P coil, R54*c* contacts, R60*a* contacts now closed, thence back to the line 131 through latch contacts 102. Contacts R54*c* also maintain a hold circuit for R37H through R37*a* and R54*c*. R56P closes R56*a* contacts to pick up R56H through R56*a*, R30*a*, R54*a*, R29*a*. R56 closes R56*c* (Fig. 7, right center) to close the return circuit of the typewriter solenoids. R31 relay opens R31*b* contacts and R37 opens its respective contacts R37*b* (see Fig. 7, lower left) to thereby break, at two points, the energizing circuit leading to the contact roll 105. This opens the master card analyzing circuit even though R54*d* contacts have closed and the R56 relay coil has closed the R56*c* contacts which are in the return circuit of the typewriter key solenoids. Thus, the master card analyzing means is ineffective until both contacts R37*b* and R31*b* close which is effected when the tabulation of the typewriter carriage has been terminated.

When the tabulating relay R26 has been picked up it closes its contacts R26*b* to energize the tabulating control solenoid 30 of the typewriter and the typewriter escapes in a customary manner until a predetermined position of the typewriter carriage is reached, determined by the position of the well known tabulating stop. At this position #2 Insert contacts 35 close to thereby complete a circuit previously described to the R60 relay. R60 relay opens the R60*a* contacts and drops out the R31H relay coil, R37H relay coil and R56P relay coil.

Deenergization of the R31 relay now permits R31*b* (Fig. 7) contacts to close the energizing circuit to the contact roll 105. Also, since the hold circuit for the R37H relay is opened, R37*b* contacts close to complete, at this time, the circuit to the contact roll 105. Therefore, the first column of the pattern card associated with the analyzing brushes 101 will be analyzed and the respective punch magnet and typewriter solenoid will be picked up to concurrently punch and print the same digit. When the column readout moves out of this first column position R31 relay drops out and its contacts R31*a* (Fig. 8) open to maintain R31H and R56P deenergized. However, the R56H relay coil is maintained energized through the R56*a*, R30*a*, R54*a* contacts, R29*a* contacts to line 131. Thus, R56*c* contacts (Fig. 7) will be maintained closed to complete the return circuit of the typewriter solenoids 30.

Card punching operations under control of the master card are carried out as in the aforementioned patent to Lee and Daly, No. 1,976,618, and as a result of the energization of a punch selecting magnet 45, the interposer will be shifted to close punch contacts 65 and a circuit will be completed from line 131, through latch contacts 102, punch contacts 65 but since contacts R56*d* are now open a circuit is completed to the R46P coil (Fig. 8) to line 130, the impulse being transmitted to such coil in view of the presently open contacts R56*d*, which contacts are maintained open during card punch duplicating operations. The R46P coil closes the R46*a* contacts (Fig. 7) and thus a delayed impulse is transmitted to the punch magnet 66 and also to R42 and R41 relays. This delay in punching operations is effected because the operation of the punch concurrently with printing must be slower than with punching alone.

When the column is reached where printing and punching duplicating operations are to be terminated, a plug connection is made from the respective column. For example, if the last duplicating operation is to be effected in the blank card in column 40 double plugging therefrom to plug sockets 178, 179 designated "Stop duplicating" and "Stop print duplicating" will energize the R29 and R30 relays after the R42*a* contacts close. R29 relay opens the R29*a* contacts (Fig. 8) and drops out R54H and R55H relays. R30*a* relay contacts open to drop out R56H and the machine is now in a condition it was just prior to start printing and punching duplicating operations. The type of ensuing operations will depend upon the plugboard setup in the machine to effect functions and operations which vary with the job to be performed.

*Duplicating punching under control of master card without printing*

In the preceding example the operation of the machine was described in connection with concurrent typing and punching of data represented on the master card. It may be desirable at times to only duplicate the data on a punched card without typing and in such instances no plug connections are made to the R31 and R30 relays. In the absence of the energization of the R56 relay the return circuit for the typewriter solenoids will be maintained open at contacts R56c (Fig. 7), it being noted that the R55 relay will open its R55b contacts (Fig. 7) to open the return circuit of the typewriter solenoids. If certain columns of the punched data on the master card are to be typed it is, of course, obvious that the desired plug connection is previously made from the column readout of the punch to the start and stop print duplicating relays R31 and R30. This selective control is an added feature and discloses the wide selectivity permissible in the present machine.

*Selective programming of successive cards under key control for bearing data to be duplicated*

It is intended that the present machine employ the "selective program feature" fully disclosed in the patent to Doty, No. 2,390,486 and in addition thereto enable such programming devices to vary and select the data to be duplicated by typing and punching. Referring to Fig. 8 it will be recalled that when the typewriter carriage returns to the left hand column margin position it closes #1 Insert contacts 34 to pick up the R63 relay as previously described. R63 relay closes its R63b contacts to prepare the closure of the circuit R59 relay. A plug connection is made from the column readout of the punch corresponding to the left marginal position of the punch card carriage to the plug socket 180 designated "Margin pick up" and when the punch card carriage returns to the left hand margin position, an impulse is transmitted through the R62b contacts to pick up R59 relay. The latter closes the R59d contacts (Fig. 7, lower right) and by an obvious circuit the R67 relay is energized. With R67 relay energized at the left hand margin position of the punch carriage and its respective *a*, *b*, *c* contacts closed (see top of Fig. 7), the depression of selected keys of the auxiliary keyboard will transmit an impulse through the respective *a*, *b*, *c* contacts of the R67 relay to the R92, R91 and R90 pickup relay coils. The particular program relay R90, R91 and R92 energized is selected by the digit keys of the auxiliary keyboard and herein shown are selected by the 7, 8 and 9 digit keys, respectively. At the same time the impulse to pick up such relays is transmitted to the related duplicating relay which effects the energization of the related punch magnet to punch in the first card column a digit representing the program relay selected. Each program relay R90, R91, R92 closes its respective "*a*" contacts to pick up the related hold relay which holds through such contacts and by a wire 181 back to line 131 through the latch contacts 102. The contacts of the energized program selector relays R90, R91, R92 are plugged to the desired card columns and to the R29, R30, R31, R54 relays, the contacts of each relay being differently plugged so as to carry out different programs of duplication of data, both punched and printed.

To show the wide diversity and variations in duplicating punching and printing operations, Figs. 16*a*, 16*b*, 16*c* and 16*d* disclose various plugging connections.

Fig. 16*a* shows the manner of plugging when it is desired to duplicate and print the data on a field of the master card.

Fig. 16*b* shows the plugging arrangement whereby the data in the field of the master card is completely punched but only part of the field of the master card controls typing operations. By means of the plug connection between plug socket No. 35 and the start print duplicate plug sockets, only columns 36-45 are typed.

Fig. 16*c* shows plugging connections where only duplicate punching is effected on the card and no printing operations.

Fig. 16*d* shows the manner in which two fields of data may be duplicate punched and in this operation of the machine there may be an automatic spacing of the punch card carriage and the master card carriage from columns 35 to 40 to omit duplicate punching of the data in such columns.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a combined typewriter and digit card punch, the combination of an auxiliary digit keyboard, said typewriter having a typewriter carriage, a typewriter keyboard including digit and punctuation keys, digit card punching means, instrumentalities operated by said digit keyboard to effect concomitant operation of said digit card punching means and said digit typing keys, means for returning the typewriter carriage to a margin position, means responsive to the margin position of the typewriter carriage to effect the automatic operation of a selected punctuation typewriter key, and means operable as a result of the concomitant digit typing and digit card punching to effect another automatic operation of a selected punctuation key after the digit typing operation.

2. In a combined typewriter and digit card punch, the combination of an auxiliary digit keyboard, said typewriter having a typewriter carriage, a typewriter keyboard including digit and punctuation keys, digit card punching means, instrumentalities operated by said digit keyboard to effect concomitant operation of said digit card punching means and said digit typing means, means for returning the typewriter carriage to a margin position, means responsive to the margin position of the typewriter carriage to effect the automatic operation of a selected punctuation typewriter key, operating means operable as a result of the concomitant digit typing and card punching to operate another punctuation key after the digit typing operation, and interlock means controlled by said digit typing means and said digit card punching means to prevent the operation of said operating means until said concomitant digit typing and digit punching are completed.

3. In a combined typewriter and digit card punch, the combination of an auxiliary digit keyboard, said typewriter having a typewriter carriage, a typewriter keyboard including digit and punctuation keys, digit card punching means, instrumentalities operated by said digit keyboard to effect concomitant operation of said digit card punching means and said digit typing keys, means for returning the typewriter carriage to a margin position, means responsive to the margin position of the typewriter carriage to effect the automatic operation of a selected punctuation typewriter key, means operable as a result of the concomitant digit typing and digit card punching to select for operation another punctuation key, and means operable as a result of the digit typing operation to effect the automatic operation of said selected punctuation key after the digit typing operation.

4. In a combined typewriter and digit card punch, the combination of an auxiliary digit keyboard, said typewriter having a typewriter carriage and said punch having a carriage, a typewriter keyboard including digit and punctuation keys, digit card punching means, instrumentalities operated by said digit keyboard to effect concomitant operation of said digit card punching means and said digit typing means, means for returning the typewriter carriage to a margin position, means responsive to the margin position of the typewriter carriage to effect the automatic operation of a selected punctuation typewriter key, means controlled by said punch carriage and operable as a result of the concomitant digit typing and card punching to select another punctuation key for operation, operating means to effect the operation of said other punctuation key, and interlock means controlled by card punch and said digit typing keys to prevent the operation of said operating means until the concomitant operation of digit typing and digit punching is completed.

5. In a combined typewriter and digit card punch, the combination of an auxiliary digit keyboard, said typewriter having a typewriter carriage, a typewriter keyboard including digit and punctuation keys, digit card punching means, instrumentalities operated by said digit keyboard to effect concomitant operation of said digit card punching means and said digit typing means, means for returning the typewriter carriage to a margin position, means responsive to the margin position of the typewriter carriage to effect the automatic operation of a selected punctuation typewriter key, means operable as a result of the concomitant digit typing and digit card punching to select for operation another punctuation key, operating means to effect the operation of said other punctuation key, means operable as a result of said digit card punching operation to prevent the operation of said operating means, and means responsive to the completion of the digit typing operation to cause the automatic operation of said operating means to thereby effect punctuation typing after digit typing.

6. In a combined typewriter and card punch, the combination of a punch carriage, column readout means positioned by said carriage, a plurality of control means for causing functional operations in said typewriter, selective connections controlled by said column readout to select a desired control means at a certain column position of said carriage, an auxiliary digit keyboard for effecting concomitant typing and punching operations, means rendered operative upon operation of said keyboard to prevent the operation of said selected control means, means to effect a typing operation, and means rendered operative upon completion of a typing operation to then enable the operation of said selected control means.

7. In a combined typewriter and card punch, the combination of a punch carriage, column readout means positioned by said carriage, a plurality of control means for causing functional operations in said typewriter, selective connections controlled by said column readout to select a desired control means at a certain column position of said carriage, an auxiliary digit keyboard for effecting concomitant typing and punching operations, means in said typewriter and operated for each typing operation, means rendered operative upon operation of said keyboard to prevent the operation of said control means, and means rendered operative by said means in the typewriter upon completion of a typing operation to then enable the operation of said selected control means.

8. In a combined typewriter and card punch, the combination of a punch carriage, column readout means positioned by said carriage, a plurality of control means for causing functional operations in said typewriter, selective connections controlled by said column readout to select a desired control means for operation at a certain column position of said carriage, an auxiliary digit keyboard for effecting concomitant typing and punching operations, means rendered operative upon operation of said keyboard upon completion of effection of concomitant digit typing and punching to suppress the operation of said control means, and means rendered operative upon completion of effection of said digit typing operation to render said suppressing means ineffective to then enable the operation of said selected control means.

9. In a combined typewriter and card punch, the combination of a punch carriage, column readout means positioned by said carriage, a plurality of electrical control means for causing functional operations in said typewriter, preset electrical plug connections made from said column readout to select a desired electrical control means at a certain column position of said carriage, an auxiliary digit keyboard for effecting concomitant typing and card punching operations, relay means energized upon operation of said keyboard to prevent the energization of said selected electrical control means, and means rendered operative upon completion of effection of a typing operation to then enable the energization of said control means.

10. A machine according to claim 9 in which the typewriter includes bail operated contacts operated as the result of any typing operation and comprising the last named means of the preceding claim.

CHARLES R. DOTY.
HERMAN J. KLOTZ.
THEODORE D. KORANYE.

REFERENCES CITED

The following references are of record in the file of this patent:

UNITED STATES PATENTS

| Number | Name | Date |
|---|---|---|
| 1,976,618 | Lee and Daly | Oct. 9, 1934 |